United States Patent [19]
Miura

[11] 3,905,439
[45] Sept. 16, 1975

[54] COURSE CORRECTING DEVICE FOR A VEHICLE

[75] Inventor: Kimio Miura, Sakado, Japan

[73] Assignee: Honda Giken Kogyo Kabushiki Kaisha, Tokyo, Japan

[22] Filed: Oct. 11, 1973

[21] Appl. No.: 405,658

[52] U.S. Cl. .......................................... 180/79.2 R
[51] Int. Cl.² ........................................... B62D 5/08
[58] Field of Search .......... 180/79.2 R, 79.2 D; 91/3

[56] References Cited
UNITED STATES PATENTS

| | | | |
|---|---|---|---|
| 2,498,284 | 2/1950 | Leonard | 91/3 |
| 2,865,462 | 12/1958 | Milliken et al. | 180/79.2 R |
| 2,902,104 | 9/1959 | Schilling | 180/79.2 R |
| 2,904,120 | 9/1959 | Bidwell | 180/79.2 R |
| 3,576,228 | 4/1971 | Kasselman | 180/79.2 R |

Primary Examiner—David Schonberg
Assistant Examiner—John A. Pekar
Attorney, Agent, or Firm—Waters, Schwartz & Nissen

[57] ABSTRACT

A device enabling the vehicle to be steered at all times to an extent exactly corresponding to a amount of steering motion given to the steering wheel irrespective of weather and road conditions that may otherwise disturb the course the vehicle takes. The device includes oil hydraulic means operable to turn the steered wheels under the control of the output of a pressure comparator with two inputs respectively proportional to the steering motion of the steering wheel and the actual change in course of the vehicle.

1 Claim, 1 Drawing Figure

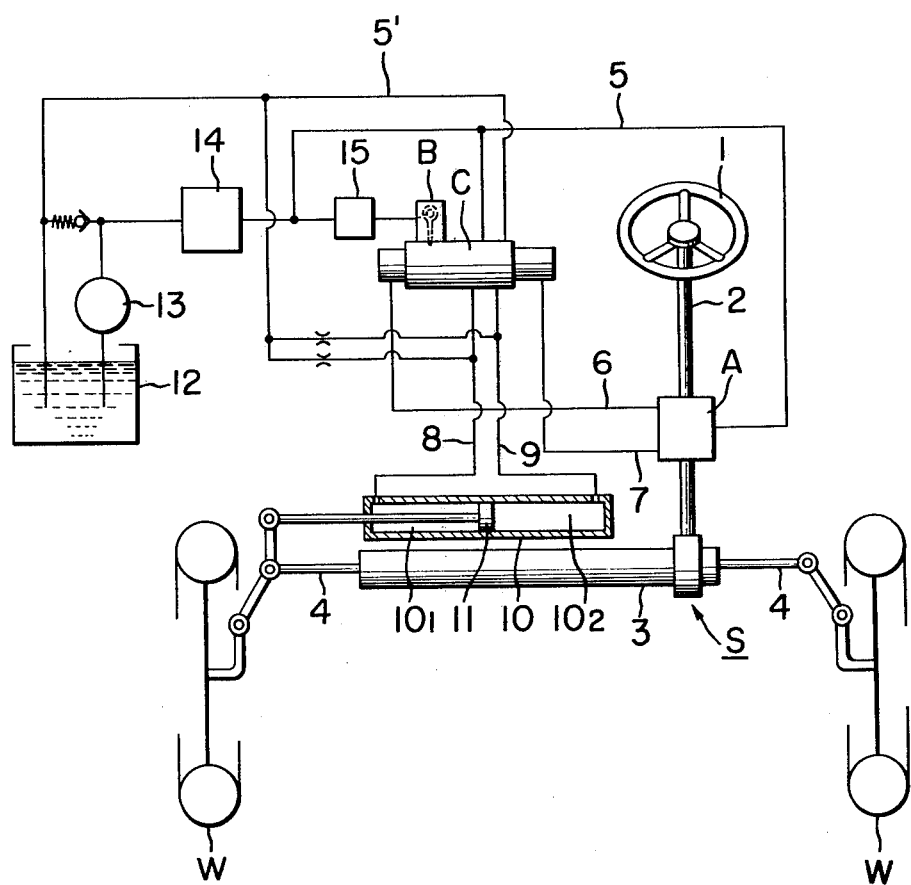

COURSE CORRECTING DEVICE FOR A VEHICLE

BACKGROUND OF THE INVENTION

This invention relates generally to the steering of a road vehicle such as an automobile and more particularly to devices for correcting any involuntary change in course of the vehicle.

Generally, a vehicle during travel tends to turn or move sidewise under external disturbances including side wind and road irregularities and take an unintended course. Such involuntary change in course of the vehicle should desirably be corrected in an automatic manner for driving safety.

SUMMARY OF THE INVENTION

Accordingly, the present invention has for its object the provision of a course correcting device for a vehicle which enables the vehicle to be steered at all times to an extent exactly corresponding to the amount of driver's steering motion irrespective of weather and road conditions.

According to the present invention, there is provided a course correcting device for a vehicle which comprises steering motion detector means adapted to produce an oil pressure output proportional to the amount of steering motion given by the driver to the steering wheel, course change detector means adapted to produce an oil pressure output proportional to the actual change in course of the vehicle, an oil pressure comparator adapted to produce an oil pressure output proportional to the difference, if any, between the output pressures of the two above-mentioned detectors, and hydraulic means operable under the control of the comparator output to correct any discordance between the actual amount in which the vehicle is steered and the amount of steering motion given to the steering wheel.

BRIEF DESCRIPTION OF THE DRAWING

The present invention will next be described in further detail with reference to the accompanying drawing, the sole FIGURE of which represents a schematic illustration of a preferred embodiment of the invention.

DESCRIPTION OF THE PREFERRED EMBODIMENT

In the drawing, there is illustrated a course correcting device for a vehicle in which any change in course of the vehicle is detected as a yaw rate, that is, an angular velocity of the vehicle about a vertical axis.

Reference character S generally indicates the steering mechanism of the vehicle, including a steering wheel 1, a steering shaft 2 extending from the steering wheel 1 and connected with a well-known type of steering gear 3, and a pair of right and left tie rods 4,4 extending from the respective ends of the steering gear 3 and linked to the respective right and left steered road wheels W,W of the vehicle. Provided on the steering shaft 2 intermediate the ends thereof is a steering motion detector A which takes the form of an oil pressure generator of the well-known proportional displacement type, to which an oil input line 5 and "right" and "left" oil output lines 6,7 are connected. It is to be understood that the detector A is designed to produce in output line 6 or 7 an oil pressure proportional in magnitude to the amount of driver's steering motion or angular displacement or steering effort imparted to the steering wheel 1.

Reference character B generally indicates a course change detector in the form of a yaw rate detector of known type including a rate gyro and which is adapted to produce an oil pressure output corresponding to the output torque of the rate gyro and hence to the yaw rate of the vehicle.

Reference character C generally indicates an oil pressure comparator adapted to compare the oil pressure output of the steering motion detector A with that of the yaw rate detector B to produce an oil pressure output proportional to the pressure difference between the two detector outputs. The comparator C is connected with a hydraulic power assembly, which includes a power cylinder 10 and a power piston 11 defining right and left chambers $10_1$ and $10_2$ therein. The oil pressure output of comparator C is directed through right and left output lines 8,9 into the right and left chambers $10_1$ and $10_2$, respectively, so that the piston 11 is actuated to the right or left with any pressure difference between the two chambers. The power piston 11 is operably connected with the adjacent end of the left tie rod 4, thus enabling the power assembly to serve as a steering corrector.

Reference numeral 12 indicates an oil reservoir; 13, an oil pump; 14, an accumulator; and 15, a pressure regulator connected between the accumulator 14 and the yaw rate detector B.

Description will next be made of the operation of the illustrated course change correcting device.

Assuming that the steering wheel 1 is turned during travel of the vehicle, for example, in a clockwise direction, the steering detector A, detecting the rotary motion of the steering wheel, produces in one of the output lines, 7, an oil pressure output proportional to the amount of steering motion, which output is directed to the input portion of the pressure comparator C on the right-hand side thereof.

Simultaneously with this, the steering motion is transmitted through the steering gear 3 to the steered wheels W,W to turn the latter so that the vehicle is rotated about a vertical axis. The angular velocity or yaw rate of the vehicle is detected by the yaw rate detector B and an oil pressure corresponding to the yaw rate detected is directed to the central input portion of the oil pressure comparator C to be compared with the oil pressure output of the steering motion detector A.

On this occasion, if there is no slippage between the steered wheels W,W and the road surface and the yaw rate of the vehicle exactly corresponds to the amount of steering motion or the angle of rotation given to the steering wheel, the oil pressure outputs of the steering and yaw rate detectors A and B are held in balance with each other in the pressure comparator C, which in this case does not produce any effective output in output lines 8,9.

On the other hand, if the road wheels W,W slip while being steered under the effect of the inertial mass of the vehicle or an external disturbance such as side wind, the yaw rate of the vehicle is correspondingly increased or descreased and the balance between the oil pressure output of the yaw rate detector B and that of the steering motion detector A is broken so that the pressure comparator C produces a definite oil pressure output, which is fed through one of the output passages 8 or 9 to the hydraulic cylinder 10 to drive the piston 11 in a direction to correct the turning motion of steered wheels W,W and hence the yaw rate of the vehicle to respective magnitudes exactly corresponding to the amount of steering motion. Obviously, this means that the vehicle is steered to an extent exactly corresponding to the angle of rotation imparted to the steering hand wheel by the driver.

It will be apparent that, when the wheel 1 is turned counter-clockwise, the steering motion detector A produces an oil pressure output in the other oil line 6 connected to the left input portion of the pressure comparator C for comparison with the output of the yaw rate detector and the hydraulic power assembly 10-11 functions to correct any involuntary change in course of the vehicle in substantially the same manner as described.

If the vehicle is forced to yaw by an external disturbance such as side wind or road irregularities when the steering wheel 1 is in its neutral position, the road wheels W,W are turned automatically in a direction opposite to that of the yawing to correct the forced change in course of the vehicle, as will readily be understood from the foregoing description.

Incidentally, any appropriate means for detecting lateral acceleration of the vehicle may be substituted for the yaw rate detector B as a means for detecting change in course of the vehicle to serve the purpose of automatically correcting the course of the vehicle in the event that the vehicle is moved sidewise, for example, by side wind.

It will be appreciated from the foregoing description that the device of the present invention serves automatically to correct any involuntary change in course of the vehicle as may occur under external disturbances such as side wind and road irregularities by keeping the amount in which the vehicle is steered in accord with the amount of actual steering motion given to the hand wheel and thus is highly beneficial to driving safety.

While one preferred embodiment of the invention has been shown and described, it will be apparent to those skilled in the art that many changes and modifications may be made therein without departing from the spirit of the invention or from the scope of the appended claim.

What is claimed is:

1. A course correcting device for a vehicle comprising steering motion detector means for producing an oil pressure output proportional to the amount of steering motion given to a steering wheel thereof, yaw rate detector means for producing an oil pressure output proportional to the detected amount of yaw rate of the vehicle, oil pressure comparator means for producing an oil pressure output proportional to any pressure difference between said oil pressure outputs of said steering motion means and said yaw rate detector means, oil hydraulic means operable under the control of the oil pressure output of said oil pressure comparator means to correct the turning movement of the steered wheels of the vehicle so that the steering motion and yaw rate are equalized, a steering gear connecting the steering wheel to the wheels of the vehicle to turn the wheels, and means connecting said hydraulic means to said vehicle wheels for separate turning thereof independently of said steering gear.

* * * * *